March 12, 1963 W. R. WINTER 3,080,912
GAS BURNERS
Filed July 11, 1958 2 Sheets-Sheet 2
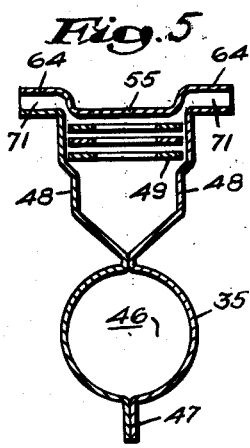
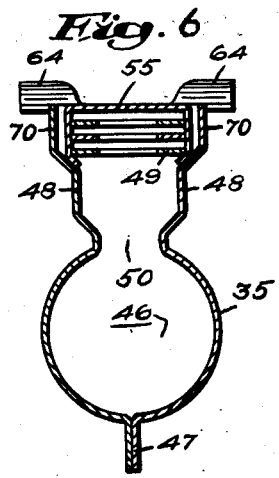
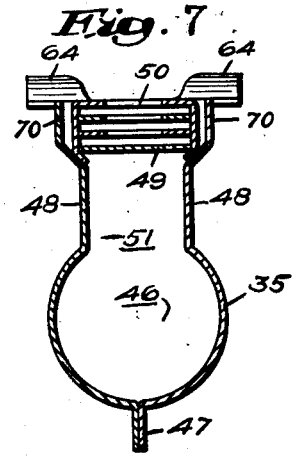
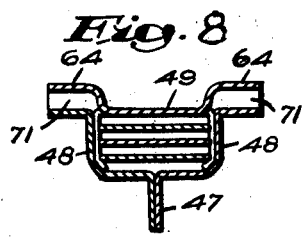
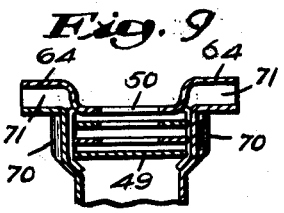
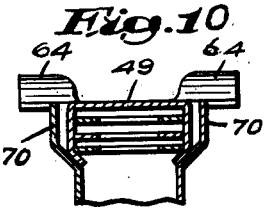
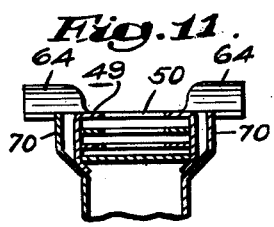

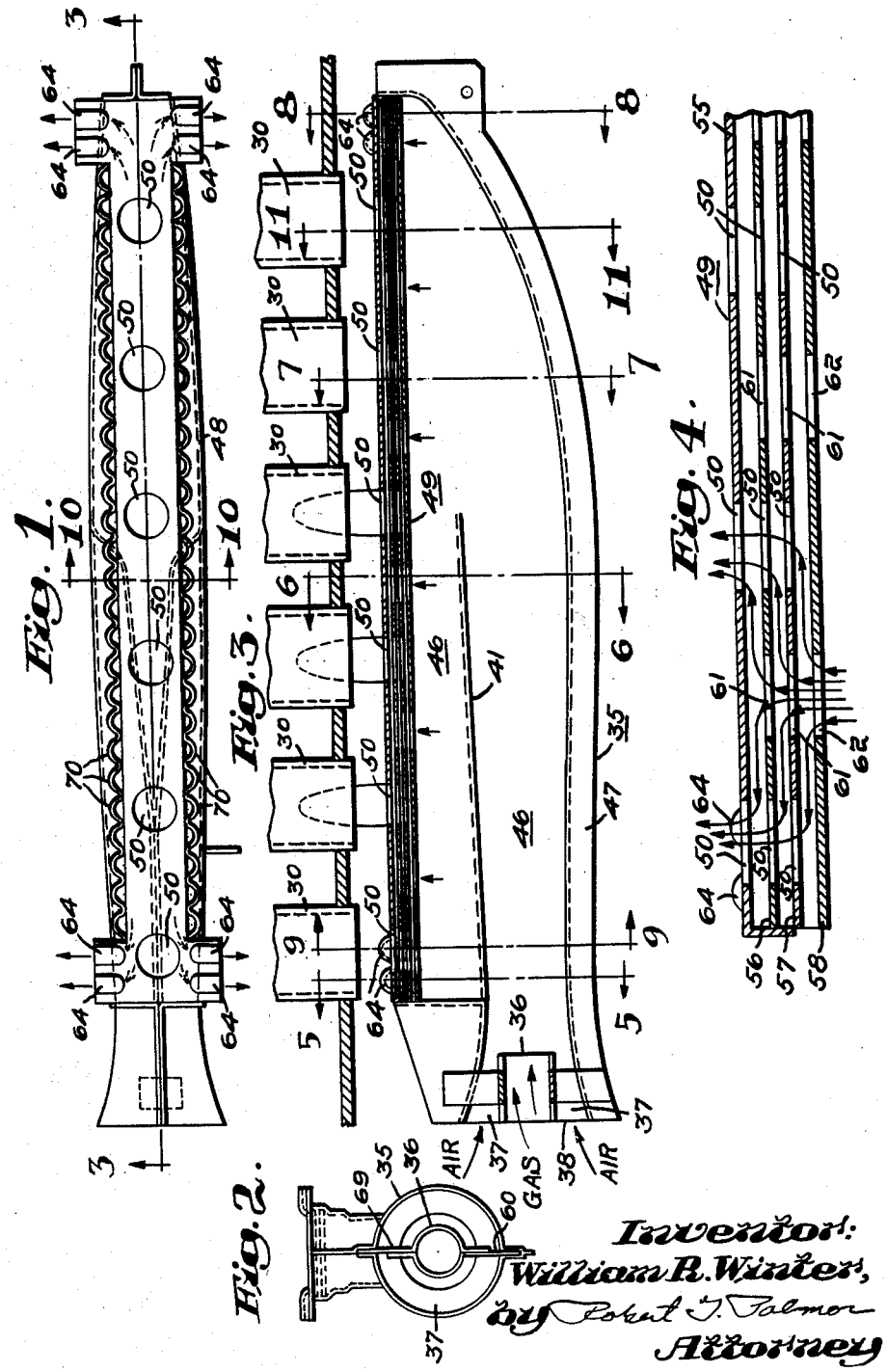

United States Patent Office 3,080,912
Patented Mar. 12, 1963

3,080,912
GAS BURNERS
William R. Winter, Staunton, Va., assignor to Westinghouse Electric Corporation, East Pittsburgh, Pa., a corporation of Pennsylvania
Filed July 11, 1958, Ser. No. 747,959
5 Claims. (Cl. 158—114)

This invention relates to gas furnaces such as are used for air heating, and has as an object to improve the gas burners used in such furnaces.

A feature of this invention is that it provides a slotted gas burner which is compact, which has a low manufacturing cost, which produces with a high air-to-gas ratio, the short flame characteristic desired in the tubular heat exchangers, which burns all available gases, and which is quiet in operation from ignition to extinction.

This invention will now be described with reference to the annexed drawings, of which:

FIG. 1 is an enlarged plan view of one of a gas burner embodying this invention;

FIG. 2 is an end view looking at the left end of FIG. 1;

FIG. 3 is a section along the line 3—3 of FIG. 1, showing in addition, the lower ends of heat exchange tubes of an associated furnace aligned with the ports of the gas burner;

FIG. 4 is an enlarged fragmentary view of the baffle of FIGS. 1, 2, and 3;

FIG. 5 is a section along the line 5—5 of FIG. 3;

FIG. 6 is a section along the line 6—6 of FIG. 3;

FIG. 7 is a section along the line 7—7 of FIG. 3;

FIG. 8 is a section along the line 8—8 of FIG. 3;

FIG. 9 is a fragmentary section along the line 9—9 of FIG. 3;

FIG. 10 is a fragmentary section along the line 10—10 of FIG. 1, and

FIG. 11 is a fragmentary section along the line 11—11 of FIG. 3.

A gas burner 35 has six, spaced-apart, distributed burner ports 50 aligned with the lower ends of corresponding heat exchange tubes 30 of a furnace which is not shown. Each burner 35 has a primary air inlet 38 connecting with a converging air passage 37 within which is supported by clamps 60, a gas supply tube 36.

Each burner 35 has inwardly of the gas tube 36, an air-gas passage 46 shaped as a venturi, of which the passage 37 is the entrance, and which supplies the mixture of primary air and gas into a baffle assembly 49. Each burner 35 has between the ends of its passage 46, a lower portion curved in a circular arc with a stiffening flange 47 at its bottom center, and opposite its flange 47 has side walls 48 which are spaced apart and which support therebetween the baffle assembly 49. Beyond the outer end of its passage 46, each burner 35 has, as shown by FIG. 8, only the baffle supporting side walls 48 and the flange 47.

The side walls 48 of each burner 35 where they join its curved portion are pinched together as shown by FIGS. 1, 3 and 5 from the outer end of the passage 46, the end closest the air inlet 38, to close off the air-gas passage 46 to prevent it from discharging directly into the baffle assembly opposite the adjacent tubes 30 closest to air and gas inlets. From just beyond the center of the second tube 30 from the air-gas inlet end of the burner, the walls 48 where they join the rounded head portion are spaced apart to form a gradually diverging passage 60 through which the passage 46 can discharge into the baffle assembly 49. Opposite the fourth, fifth and sixth tubes 30 from the inlet end of the passage 36, the walls 48 are uniformly spaced apart to provide a wider passage 51 to the baffle assembly 49. The passages between the passage 46 and the baffle assembly 49 are shaped as described to prevent the tube 30 nearest the air and gas inlet end of the passage 36 from being over-supplied, and the other tubes under-supplied with the air-gas mixture.

Each baffle assembly 49 consists of four, spaced-apart, parallel, metal sheets 55, 56, 57 and 58 arranged in the order named, from the top to the bottom of the baffle assembly, the top sheet 55 being nearest to and extending parallel to the aligned, open ends of the assembled tubes 30, and the bottom sheet 58 being nearest the air-gas passage 46. The top sheet 55 and the two intermediate sheets 56 and 57 have circular openings 50 aligned with the ends of the corresponding tubes 30, the openings 50 in the top sheet 55 forming the previously mentioned distributes burner ports. The intermediate sheets 56 and 57 also have aligned circular openings 61 halfway between adjacent pairs of openings 50. The bottom sheet 58 has circular openings 62 aligned with openings 61.

The primary air-gas supplied to a baffle assembly enters the openings 62 in a lower sheet 58, and then splits into streams between the sheets 58 and 57, passes through openings 50 and 61 in the sheet 57, splits into streams between the sheets 57 and 56, passes through openings 50 and 61 in the sheet 56, splits into streams between the sheets 56 and 55, and finally passes out the openings 50 in the sheet 55, into the lower ends of the associated tubes 30. The lower ends of the tubes 30 are spaced from the top sheet 55 as shown by FIG. 3, and secondary air enters the lower ends of the tubes 30, 360° around the aligned baffle openings 50.

The baffle assembly is provided with the tortuous air-gas passages for preventing flash-back which is successfully prevented despite the relatively large volume of primary air supplied into the venturi 46. In prior arrangements, such large volumes of primary air often resulted in undesired flash-back.

The burner side walls 48 are formed along their upper edges as corrugated ribbons, having corrugated portions 70 spaced outwardly from each side of the baffle assembly as shown in FIGS. 9–11, and between the dimpled portions 70 contacting and supporting the sides of the baffle assembly as shown by FIGS. 5–7. The corrugated portions 70 provide closely spaced ports for transmitting a flame from an end port that is lighted first to the other ports.

The top sheet 55 of each baffle assembly has a pair of corrugated portions 64 at each of its ends, forming air-gas passages 71 which are directed towards correspondingly formed air-gas passages 71 of adjacent sheets 55 of adjacent burners, and serve to transmit flame from the first lighted burner to the burners on each side of it.

A pilot burner which is not shown establishes a flame in the open end of an end tube 30. The flame propogates through ports formed by corrugated portions 70 to the remainder of the tubes 30. The flame from the row of tubes 30 is propogated through the passages 71 of the end sheet 55 of that row to an adjacent row of tubes which is not shown.

I claim:
1. A gas burner having a curved lower portion with an air and gas inlet opening in one end, having spaced-apart, upwardly extending sides joining with said curved portion, and a baffle assembly supported between the upper portions of said sides, said assembly including a top sheet having a plurality of ports extending along its longitudinal center and spaced too far apart to permit chain ignition, one from another, including a bottom sheet having spaced-apart openings for the admission of mixed air and gas, and including baffle means between said sheets for extending the lengths of the paths of the mixed air and gas passing between said openings and said ports, said sides having upper portions which contact the sides of said assembly at a plurality of spaced-apart points which are substantially closer spaced than are said parts, and between said points are spaced from said sides of said assembly to form mixed air and gas openings substantially larger in number, smaller in size, and more closely spaced than said ports, by means of which a flame at an end one of said ports can be propagated by said last mentioned openings alongside said top sheet.

2. A gas burner as claimed in claim 1 in which said top sheet has outwardly extending portions at its ends with upwardly extending bulges therein, and in which the tops of said sides of said burner at their ends extend outwardly under said bulges for forming with said bulges, transverse passages for transmitting flames to similarly formed passages of adjacent similar burners.

3. A gas burner as claimed in claim 1 in which the spacing between the lower portions of said sides of said burned is tapered from no spacing opposite the one of said ports closest to said inlet opening to maximum spacing opposite the one of said ports most remote from said inlet opening.

4. A gas burner as claimed in claim 1 in which the lower portions of said sides of said burner adjacent to where they join said curved portion are pinched together to close off the passage between said sides of said burner opposite the one of said ports nearest said inlet opening, and between said one port and others of said ports, said sides of said burner are progressively separated to form a wider passage therebetween opposite said other ports.

5. A gas burner as claimed in claim 4 in which said top sheet has outwardly extending portions at its ends with upwardly extending bulges therein, and in which the tops of said sides of said burner at their ends outwardly under said bulges for forming with said bulges, transverse passages for transmitting flames to similarly formed passages of adjacent similar burners.

References Cited in the file of this patent

UNITED STATES PATENTS

| | | |
|---|---|---|
| 2,194,733 | Anderson et al. | Mar. 26, 1940 |
| 2,255,636 | Wittmann | Sept. 9, 1941 |
| 2,289,759 | Denise | July 14, 1942 |
| 2,465,151 | Dresen | Mar. 22, 1949 |
| 2,499,482 | Flynn | Mar. 7, 1950 |
| 2,572,273 | Miller et al. | Oct. 23, 1951 |
| 2,670,790 | Marble | Mar. 2, 1954 |
| 2,875,821 | Allen | Mar. 3, 1959 |

FOREIGN PATENTS

| | | |
|---|---|---|
| 328,738 | France | Jan. 23, 1903 |
| 853,952 | Germany | Oct. 30, 1952 |
| 685,855 | Great Britain | Jan. 14, 1953 |
| 1,127,936 | France | Aug. 20, 1956 |